Dec. 6, 1949  G. SWAHNBERG  2,490,170
KNIFE STRUCTURE FOR LAWN MOWERS AND THE LIKE
Filed April 12, 1945
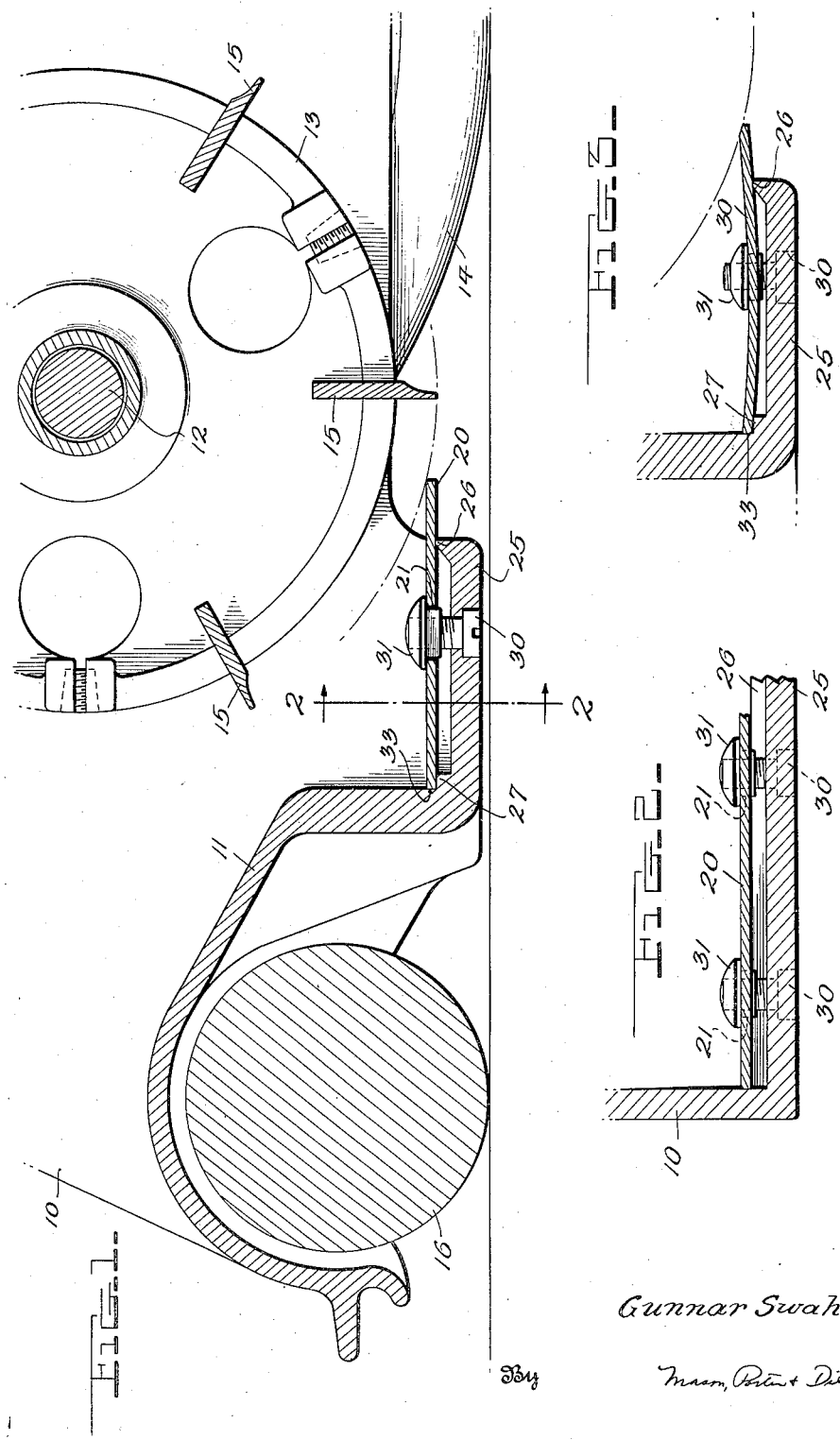
Inventor
Gunnar Swahnberg
By
Mason, Porter & Diller
Attorneys Patented Dec. 6, 1949

2,490,170

UNITED STATES PATENT OFFICE 2,490,170

KNIFE STRUCTURE FOR LAWN MOWERS AND THE LIKE

Gunnar Swahnberg, Keene, N. H.

Application April 12, 1945, Serial No. 587,854

2 Claims. (Cl. 56—249)

This invention relates to structures of stationary knife devices for lawn mowers and like cutting instruments.

A feature of the invention is a stationary resiliently flexible knife blade and means for supporting the same, with inclusion of means for flexing the blade into a transverse arch or bow and thereby effecting adjustment to proper cutting condition as the blade becomes worn.

Another feature is the provision of a lawn mower structure having a rigid support, including spaced fulcra, a flexible blade of resilient material, and adjustment devices for causing flexing the blade between the fulcra and thereby causing a cutting edge to move toward the rotating knives.

With these and other features as objects in view, as will appear in this disclosure and claims, an illustrative form of practicing the invention is shown in the accompanying drawing, in which:

Figure 1 is an upright section radially through the cage assembly of a lawn mower.

Figure 2 is an upright section, substantially on line 2—2 of Figure 1, showing a part of the blade assembly.

Figure 3 is a view of the blade assembly, corresponding to a part of Fig. 1, but with the blade in a different position of adjustment.

In these drawings, the lawn mower body is shown as having a frame with the side members 10 and a transverse member providing a floor 11, which are fixedly secured together to provide a rigid support. The shaft 12 for the cage spiders 13 is mounted on the frame and can be rotated in the usual manner from the ground wheels 14 as the lawn mower is trundled over the ground. The cage spiders 13 support the rotating knives 15. A roller 16 is supported from the frame by means (not shown) for controlling the desired height of the cutting action above the ground level. These parts are illustrative only, and their particular shape and construction forms no part of the present invention.

The stationary knife blade 20 is a flat strip of resilient material of uniform width, which can be formed of hard steel of rectangular cross-section and having apertures 21 along its center.

The floor 11 has a horizontal shelf 25 provided with the transversely arranged raised ribs 26, 27 at its front and rear edges, the front rib 26 preferably having only a narrow top surface. The blade 20 rests upon these ribs as supporting fulcra, with its front cutting edge extending beyond the front rib 26.

Countersunk holes in the shelf 25 receive bolts 30 which extend upward therein and through the apertures 21 of the blade. Nuts 31 are engaged with these bolts and have enlarged heads to engage the upper surface of the blade. It is preferred to have these enlarged portions rounded, to prevent hanging of the clippings. At the initial assembly of parts, the bolt-nut devices are tightened slightly to give only a very slight bow or inverted arch to the blade 20, for holding it in position with its rear edge abutting a part 33 of the fixed frame structure, so that the cutting action between the blades is accompanied by a rearward thrust across the blade essentially in the direction of its plane, and transmission of this thrust to the frame independently of the clamping bolts. It is preferred to have the length of the blade 20 a close fit in the space between the side members 10 (see Fig. 2), to prevent endwise movement of the blade while the parallel relationship of the frame part 33 to the axis of the rotating cage assures proper alinement of the cutting edges of the rotating and stationary knives.

As the blades wear, tightening of the bolt-nut devices causes flexing of the blade, against the resiliency of its material, wherewith (Fig. 3) the front or operative cutting edge of the stationary blade is moved toward the rotating blades and the proper cutting condition can be attained. When this compensating adjustment has been repeated until the edge becomes undesirably thin at its edge, the bolt-nut clamping devices are removed, the blade 20 turned end for end and replaced with the edge which was previously at the rear now located at the front, and the clamping devices inserted again: whereupon the lawn mower can now function with the new operative cutting edge at the front.

It is obvious that the invention can be employed in many other ways within the scope of the appended claims.

What is claimed is:

1. A lawn mower, having a frame, a rigid support member fixed to said frame and having a pair of transversely extending fulcra spaced horizontally from one another and immovable relative to the frame, a flat blade of resiliently flexible material of uniform width overlying and resting on said fulcra with its front edge projecting beyond the front fulcrum, and clamping means engaged with the member between said fulcra and engaged with the upper surface of the blade and including a threaded portion whereby the blade may be bowed downwardly between the fulcra for adjustingly raising the front edge.

2. A lawn mower having a frame, and a rigid stationary blade support comprising a transverse member fixed to and immovable relative to said frame having a pair of upwardly extending transverse ribs providing fulcra integral therewith and spaced horizontally from one another, a blade of resiliently flexible material overlying and resting on said fulcra with its front edge projecting beyond the front fulcrum, said blade being initially of rectangular cross-section and having apertures along its center line, a plurality of bolts and nuts passed through apertures of said blade and through the said transverse member at points between said fulcra, said nuts having rounded upper portions and engaging the upper surface of said blade, said bolts and nuts being effective for bowing the blade downwardly between the fulcra for adjustingly raising the front edge of said blade, and a stop member integral with said transverse member and engaged with the rear edge of said blade.

GUNNAR SWAHNBERG.

REFERENCES CITED

The following references are of record in the file of this patent:

UNITED STATES PATENTS

| Number | Name | Date |
|---|---|---|
| 817,157 | Coldwell | Apr. 10, 1906 |
| 905,591 | Rowe | Dec. 1, 1908 |
| 1,516,419 | Case | Nov. 18, 1924 |
| 1,795,102 | Wenham | Mar. 3, 1931 |
| 1,903,183 | Jessup | Mar. 28, 1933 |